United States Patent
Walter et al.

(10) Patent No.: US 8,935,738 B2
(45) Date of Patent: Jan. 13, 2015

(54) SYSTEM AND METHOD OF PROVIDING INTERACTIVE VIDEO CONTENT

(75) Inventors: Edward Walter, Boerne, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 743 days.

(21) Appl. No.: 11/638,687

(22) Filed: Dec. 13, 2006

(65) Prior Publication Data

US 2008/0148336 A1   Jun. 19, 2008

(51) Int. Cl.

| | |
|---|---|
| *H04N 7/173* | (2011.01) |
| *H04N 21/435* | (2011.01) |
| *H04N 21/235* | (2011.01) |
| *H04N 21/236* | (2011.01) |
| *H04N 21/258* | (2011.01) |
| *H04N 21/858* | (2011.01) |
| *H04N 21/234* | (2011.01) |
| *H04N 7/088* | (2006.01) |

(52) U.S. Cl.
CPC ........ *H04N 21/435* (2013.01); *H04N 21/23424* (2013.01); *H04N 7/0885* (2013.01); *H04N 21/235* (2013.01); *H04N 21/23614* (2013.01); *H04N 21/25866* (2013.01); *H04N 21/8586* (2013.01)
USPC .............. 725/112; 725/32; 725/116; 725/146

(58) Field of Classification Search
CPC .......... H04N 21/234; H04N 21/23424; H04N 21/236; H04N 21/47; H04N 21/472; H04N 21/4725; H04N 21/851; H04N 21/858; H04N 21/8586; H04N 21/812
USPC ............... 725/112, 116, 136, 32, 34–36, 146
See application file for complete search history.

(56) References Cited

U.S. PATENT DOCUMENTS

| | | | |
|---|---|---|---|
| 5,818,935 A | 10/1998 | Maa | |
| 6,169,541 B1 | 1/2001 | Smith | |
| 6,668,278 B1* | 12/2003 | Yen et al. | 709/218 |
| 6,874,160 B1* | 3/2005 | Herz | 725/58 |
| 6,944,585 B1* | 9/2005 | Pawson | 703/22 |
| 2002/0056109 A1* | 5/2002 | Tomsen | 725/60 |
| 2002/0129362 A1* | 9/2002 | Chang et al. | 725/32 |
| 2002/0194589 A1* | 12/2002 | Cristofalo et al. | 725/32 |
| 2003/0028873 A1* | 2/2003 | Lemmons | 725/36 |
| 2003/0046690 A1* | 3/2003 | Miller | 725/36 |
| 2003/0126597 A1* | 7/2003 | Darby et al. | 725/32 |
| 2004/0040042 A1* | 2/2004 | Feinleib | 725/112 |
| 2004/0210942 A1* | 10/2004 | Lemmons | 725/135 |
| 2004/0261096 A1* | 12/2004 | Matz | 725/28 |
| 2007/0055985 A1* | 3/2007 | Schiller et al. | 725/34 |
| 2007/0067807 A1* | 3/2007 | O'Neil | 725/62 |
| 2007/0220575 A1* | 9/2007 | Cooper et al. | 725/118 |

* cited by examiner

*Primary Examiner* — Farzana Hossain
(74) *Attorney, Agent, or Firm* — Toler Law Group, PC (57) ABSTRACT

A method of providing interactive video content is presented that includes receiving video content from a video content source. An initial interactive content indicator is encoded within a closed-captioning portion of the video content at the video content source. The method also includes selecting a substitute uniform resource locator (URL) associated with interactive content related to the video content. Further, the method includes replacing the initial interactive content indicator with the substitute URL within the closed-captioning portion of the video content.

27 Claims, 7 Drawing Sheets

SYSTEM AND METHOD OF PROVIDING INTERACTIVE VIDEO CONTENT

FIELD OF THE DISCLOSURE

The present disclosure relates generally to providing interactive video content.

BACKGROUND

Television viewing is a part of daily life for many people. As technologies other than broadcast and cable television are developed to deliver video content, interactive content, such as Internet content, can be provided. Nonetheless, such delivery systems typically provide interactive information that is selected by video content sources, rather than by video content service providers that serve particular groups of customers. Hence, there is a need for an enhanced system and method of providing interactive video content.

DETAILED DESCRIPTION OF THE DRAWINGS

The present disclosure is generally directed to a system and method of providing interactive video content. In a particular embodiment, a system to provide interactive video content is disclosed that includes a server of an Internet Protocol Television (IPTV) system. The server is adapted to receive video content from a video content source. An initial interactive content indicator is encoded within a closed-captioning portion of the video content at the video content source. The server is also adapted to select a substitute uniform resource locator (URL) associated with interactive content related to the video content. The substitute URL is selected based at least partially on a profile associated with a subscriber account. The server is also adapted to replace the initial interactive content indicator with the substitute URL within the closed-captioning portion of the video content. In a particular embodiment, the video content can be sent to a set-top box device related to the subscriber account after the initial interactive content indicator is replaced with the substitute URL.

In another embodiment, a set-top box device is disclosed that includes a processor and a memory device accessible to the processor. The set-top box device also includes an interface to communicate with a private access network to receive video content from a video head-end of an Internet Protocol Television (IPTV) system. The video content includes an initial interactive content indicator encoded within a closed-captioning portion of the video content. The memory device includes instructions executable by the processor to receive the video content. The memory device also includes instructions executable by the processor to send a request for a viewer-specific uniform resource locator (URL) to the video head-end via the private access network and to replace the initial interactive content indicator with the viewer-specific URL within the closed-captioning portion of the video content.

In another embodiment, the disclosure is directed to a method of providing interactive video content that includes receiving video content from a video content source. An initial interactive content indicator is encoded within a closed-captioning portion of the video content at the video content source. The method also includes selecting a substitute uniform resource locator (URL) associated with interactive content related to the video content. Further, the method includes replacing the initial interactive content indicator with the substitute URL within the closed-captioning portion of the video content.

In another embodiment, the disclosure is directed to a method of providing interactive video content that includes receiving video content via a private access network of an Internet Protocol Television (IPTV) system. An initial interactive content indicator is encoded within a closed-captioning portion of the video content. The method also includes sending a request for a viewer-specific uniform resource locator (URL) to a video head-end of the IPTV system via the private access network. The method also includes replacing the initial interactive content indicator with the viewer-specific URL within the closed-captioning portion of the video content.

In another embodiment, the disclosure is directed to a computer-readable medium tangibly embodying instructions executable by a processor to receive video content from a video content source. An initial interactive content indicator is encoded within a closed-captioning portion of the video content at the video content source. The computer-readable medium also includes instructions executable by the processor to select a substitute uniform resource locator (URL) associated with interactive content related to the video content. The substitute URL is selected based at least partially on a profile associated with a subscriber account. Further, the computer-readable medium includes instructions executable by the processor to replace the initial interactive content indicator with the substitute URL within the closed-captioning portion of the video content.

Figure 1:
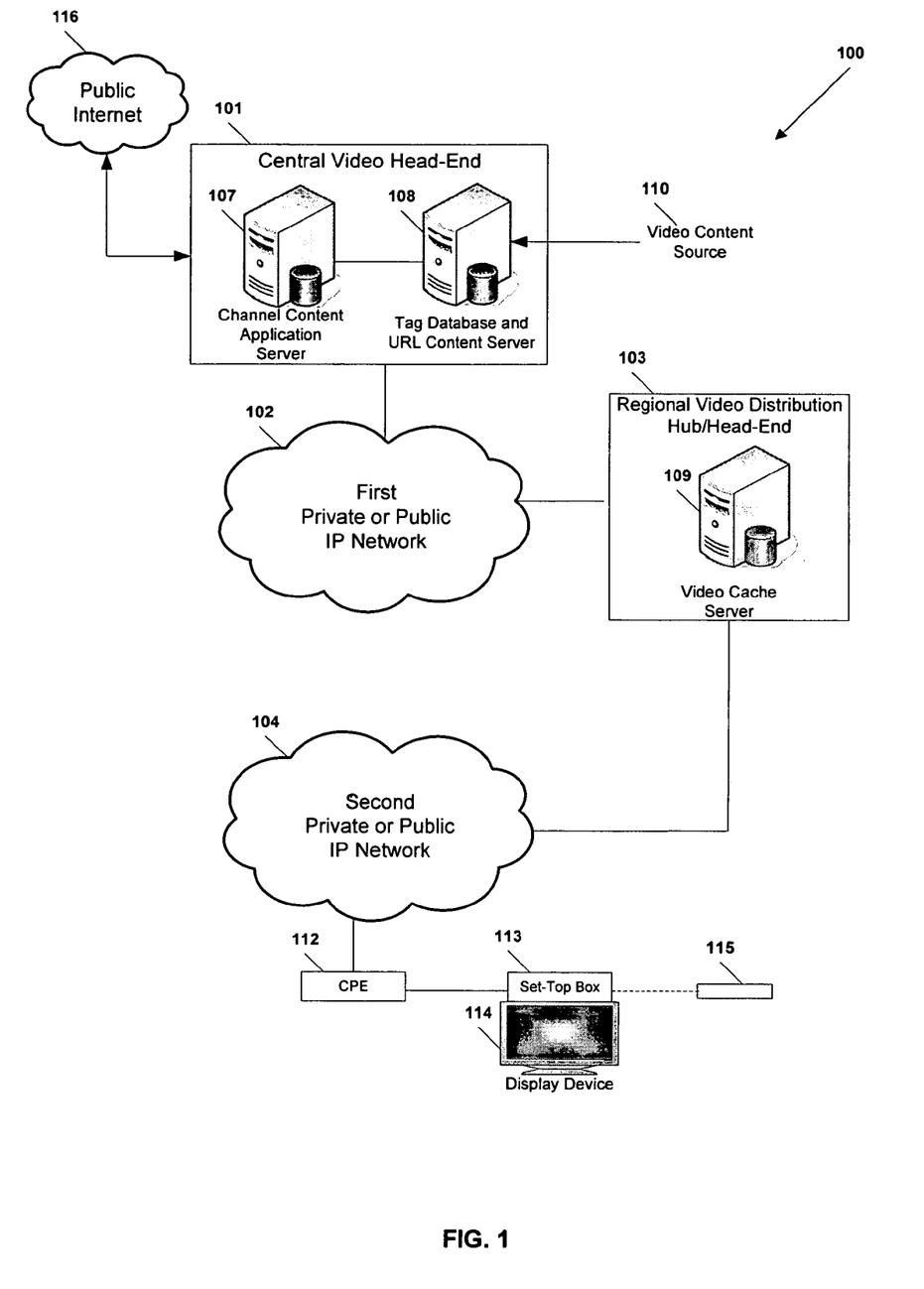
FIG. 1 is a block diagram of a particular illustrative embodiment of a system to provide interactive video content.

Referring to FIG. 1, a particular illustrative embodiment of a system to provide interactive video content is illustrated and is generally designated 100. As shown, the system 100 includes a central video head-end 101 communicating with a set-top box device 113. In a particular embodiment, the central video head-end 101 can communicate with a regional video distribution hub or regional video head-end 103 via a first private or public Internet Protocol (IP) network 102, and the regional video distribution hub or head-end 103 can communicate with the set-top box device 113 via a second private or public IP network 104, such as a private access network of an Internet Protocol Television (IPTV) system.

In an illustrative embodiment, the set-top box device 113 can communicate with the second private or public IP network 104 via customer premises equipment (CPE) 112, such as a residential gateway device. Further, the set-top box device 113 can be coupled to a display device, such as a television 114 and can communicate wirelessly with a remote control device 115.

In a particular embodiment, the central video head-end 101 can include a channel content application server 107 communicating with a tag database and uniform resource locator (URL) content server 108. In an illustrative embodiment, the regional video distribution hub or video head-end 103 can include a video cache server 109.

In a particular illustrative embodiment, the central video head-end 101 can receive video content from a video content source 110. The video content includes at least a video portion and a closed-captioning portion. A video content provider can encode an initial interactive content indicator within the closed-captioning portion of the video content at the video content source 110. For instance, the video content provider can mark one or more data packets, frames, or any combination thereof, of the video content with content tags, and the initial video content indicator can include a generic or default tag value assigned by the video content provider. In an illustrative embodiment, the initial interactive video content indicator can include a generic URL, such as the generic URL illustrated in FIG. 6. In another embodiment, the initial interactive content indicator can include a default URL, such as a URL associated with the video content source 110 (e.g., www.cbs.com).

The tag database and URL content server 108 can decode the closed-captioning portion of the video content, for example, by decoding one or more data packets or frames of the video content, and identify the initial interactive content indicator. For example, the tag database and URL content server 108 can produce an American Standard Code for Information Interchange (ASCII) character stream and parse the stream to find a tag having an initial interactive content indicator as its tag value. The tag database and URL content server 108 can select a substitute URL associated with interactive content related to the video content and replace the initial interactive content indicator with the substitute URL within the closed-captioning portion of the video content.

In an illustrative embodiment, the tag database and URL content server 108 can select a substitute URL from a plurality of URLs stored in memory at the tag database and URL content server 108 or at a database coupled to, or otherwise accessible to, the tag database and URL content server 108. The tag database and URL content server 108 can select the substitute URL based on information related to a subscriber or group of subscribers, such as a profile associated with a subscriber account. The profile can include a demographic classification or identifier (e.g., a Microvision Segment Identifier), a geographic region, a market area, a neighborhood, a zip code, a subscriber preference, a buying habit, a web surfing habit, another subscriber behavior, a calendar date, a time of day, a season, a credit score, or any combination thereof. The substitute URL can include a URL associated with interactive content related to a product or service displayed by the video content and sold in the market area of a subscriber or group of subscribers served via the regional video distribution hub or head-end 103.

For example, where the video content displays a portable music device, a luxury sedan and a set of diamond earrings, the substitute URL may correspond to content related to the portable music device, if the profile indicates that the viewer lives on a college campus. On the other hand, the substitute URL may correspond to content related to the luxury sedan if the profile indicates that the viewer is between 35 and 45 years old. Whereas, the substitute URL may correspond to content related to the earrings if the profile indicates that the viewer is a female in a certain income bracket or neighborhood.

After the initial interactive content indicator is replaced with the substitute URL, the video content can be sent to the set-top box device 113. In an illustrative embodiment, the tag database and URL content server 108 can send the video content to the channel content application server 107, and the channel content application server 107 can send the video content to the set-top box device 113 via the regional video distribution hub or head-end 103.

In a particular embodiment, the tag database and URL content server 108 can receive data from the set-top box device 113 indicating a selection of the substitute URL. The tag database and URL content server 108 can retrieve interactive content associated with the substitute URL, such as web page content, via the public Internet 116. The tag database and URL content server 108 can send the interactive content to the set-top box device 113, or the tag database and URL content server 108 can send the interactive content to the channel content application server 107 for delivery to the set-top box device 113.

Figure 2:
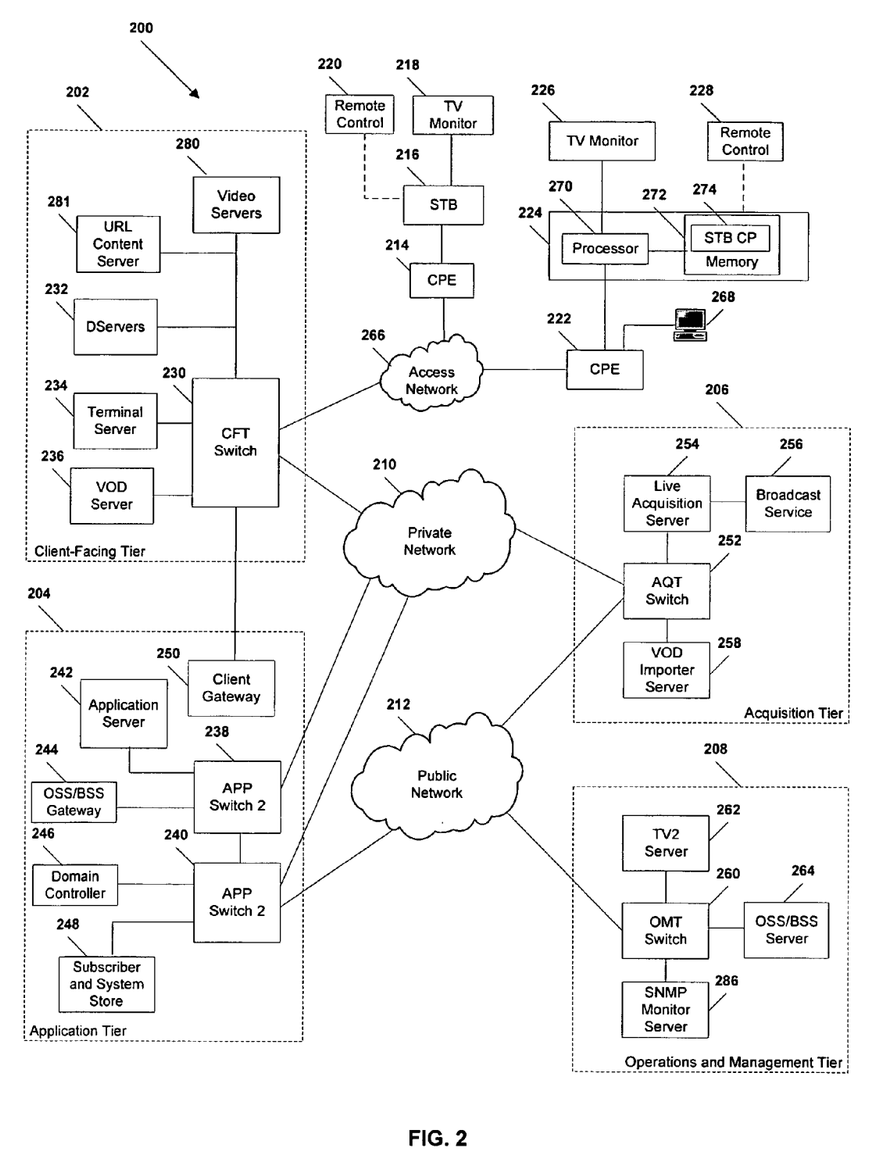
FIG. 2 is a block diagram of a second particular illustrative embodiment of a system to provide interactive video content.

Referring to FIG. 2, an illustrative embodiment of an Internet Protocol Television (IPTV) system that can be used to provide interactive video content is illustrated and is generally designated 200. As shown, the system 200 can include a client facing tier 202, an application tier 204, an acquisition tier 206, and an operations and management tier 208. Each tier 202, 204, 206, 208 is coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202.

The client-facing tier 202 can communicate with user equipment via an access network 266, such as a private IPTV access network. In an illustrative embodiment, customer premises equipment (CPE) 214, 222 can be coupled to a digital subscriber line access multiplexer (DSLAM), service area interface (SAI), edge device, video distribution hub, other device, or any combination thereof, of the access network 266. The client-facing tier 202 can communicate with a first representative set-top box device 216 via the first CPE 214 and with a second representative set-top box device 224 via the second CPE 222. In a particular embodiment, the first representative set-top box device 216 and the first CPE 214 can be located at a first customer premise, and the second representative set-top box device 224 and the second CPE 222 can be located at a second customer premise. In another particular embodiment, the first representative set-top box device 216 and the second representative set-top box device 224 can be located at a single customer premise, both coupled to one of the CPE 214, 222. The CPE 214, 222 can include routers, local area network elements, modems, such as digital subscriber line (DSL) modems, any other suitable devices for facilitating communication between a set-top box device and the access network 266, or any combination thereof.

In an exemplary embodiment, the client-facing tier 202 can be coupled to the CPE 214, 222 via fiber-optic cables. In another exemplary embodiment, the CPE 214, 222 can be digital subscriber line (DSL) modems that are coupled to one or more network nodes via twisted pairs, and the client-facing tier 202 can be coupled to the network nodes via fiber-optic cables. Each set-top box device 216, 224 can process data received via the access network 266, via an IPTV software platform, such as Microsoft® TV IPTV Edition.

The first set-top box device 216 can be coupled to a first external display device, such as a first television monitor 218, and the second set-top box device 224 can be coupled to a second external display device, such as a second television monitor 226. Moreover, the first set-top box device 216 can communicate with a first remote control device 220, and the second set-top box device 224 can communicate with a second remote control device 228. The set-top box devices 216, 224 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 216, 224 can receive data, video, or any combination thereof, from the client-facing tier 202 via the access network 266 and render or display the data, video, or any combination thereof, at the display device 218, 226 to which it is coupled. In an illustrative embodiment, the set-top box devices 216, 224 can include tuners that receive and decode television programming signals or packet streams for transmission to the display devices 218, 226. Further, each of the set-top box devices 216, 224 can include a processor and a memory device accessible to the processor, such as the STB processor 270 and the STB memory device 272. In one embodiment, a computer program, such as the STB computer program 274, can be embedded within the STB memory device 272.

In an illustrative embodiment, the client-facing tier 202 can include a client-facing tier (CFT) switch 230 that manages communication between the client-facing tier 202 and the access network 266 and between the client-facing tier 202 and the private network 210. As illustrated, the CFT switch 230 is coupled to one or more data servers, such as D-servers 232, that store, format, encode, replicate, or otherwise manipulate or prepare video content for communication from the client-facing tier 202 to the set-top box devices 216, 224. The CFT switch 230 can also be coupled to a terminal server 234 that provides terminal devices with a connection point to the private network 210. In a particular embodiment, the CFT switch 230 can be coupled to a video-on-demand (VOD) server 236 that stores and provides VOD content imported by the IPTV system 200. Further, the CFT switch 230 is coupled to one or more video servers 280 that receive video content and transmit the video content to the set-top boxes 216, 224 via the access network 266. In a particular embodiment, the CFT switch 230 can be coupled to a uniform resource locator (URL) content server 281 that stores URLs, replaces initial interactive content indicators in video content with substitute URLs, and retrieves URL content.

In an illustrative embodiment, the client-facing tier 202 can communicate with a large number of set-top boxes, such as the representative set-top boxes 216, 224 over a wide geographic area, such as a metropolitan area, a viewing area, a statewide area, a regional area, a nationwide area or any other suitable geographic area, market area, or subscriber or other customer group that can be supported by networking the client-facing tier 202 to numerous set-top box devices. In a particular embodiment, the CFT switch 230, or any portion thereof, can include a multicast router or switch that communicates with multiple set-top box devices via a multicast-enabled network.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box devices 216, 224 via the access network 266, which enable the set-top box devices 216, 224 to provide functions, such as interactive program guides, video gaming, display, messaging, processing of VOD material and other IPTV content, user interfaces, etc. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

The second APP switch 240 can be coupled to a domain controller 246 that provides Internet access, for example, to users at their computers 268. For example, the domain controller 246 can provide Internet access to IPTV account information, e-mail, personalized Internet services, or other online services via the public network 212. In addition, the second APP switch 240 can be coupled to a subscriber and system store 248 that includes account information, such as account information that is associated with users who access the IPTV system 200 via the private network 210 or the public network 212. In an illustrative embodiment, the subscriber and system store 248 can store subscriber or customer data and create subscriber or customer profiles that are associated with IP addresses, stock-keeping unit (SKU) numbers, other identifiers, or any combination thereof, of corresponding set-top box devices 216, 224. In another illustrative embodiment, the subscriber and system store 248 can store data associated with capabilities of set-top box devices associated with particular subscribers.

In a particular embodiment, the application tier 204 can include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. In an illustrative embodiment, the set-top box devices 216, 224 can access the IPTV system 200 via the access network 266, using information received from the client gateway 250. User devices can access the client gateway 250 via the access network 266, and the client gateway 250 can allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the first representative set-top box device 216 accesses the client-facing tier 202 via the access network 266, the client gateway 250 can verify subscriber information by communicating with the subscriber and system store 248 via the private network 210. Further, the client gateway 250 can verify billing information and status by communicating with the OSS/BSS gateway 244 via the private network 210. In one embodiment, the OSS/BSS gateway 244 can transmit a query via the public network 212 to the OSS/BSS server 264. After the client gateway 250 confirms subscriber information, billing information, or any combination thereof, the client gateway 250 can allow the set-top box device 216 to access IPTV content, VOD content, other content, or any combination thereof, via the client-facing tier 202. If the client gateway 250 cannot verify subscriber information, billing information, or any combination thereof, for the set-top box device 216, e.g., because it is connected to an unauthorized twisted pair, the client gateway 250 can block transmissions to and from the set-top box device 216 beyond the access network 266.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives or acquires television content, movie content, advertisement content, other video content, or any combination thereof, from a broadcast service 256, such as a satellite acquisition system or satellite head-end office, or another video content source. In a particular embodiment, the live acquisition server 254 can transmit content to the AQT switch 252, and the AQT switch 252 can transmit the content to the CFT switch 230 via the private network 210.

In an illustrative embodiment, content can be transmitted to the D-servers 232, where it can be encoded, formatted, stored, replicated, or otherwise manipulated and prepared for communication from the video server(s) 280 to the set-top box devices 216, 224. The CFT switch 230 can receive content from the video server(s) 280 and communicate the content to the CPE 214, 222 via the access network 266. The set-top box devices 216, 224 can receive the content via the CPE 214, 222, and can transmit the content to the television monitors 218, 226. In an illustrative embodiment, video portions, audio portions, or any combination thereof, of the content can be streamed to the set-top box devices 216, 224.

Further, the AQT switch 252 can be coupled to a video-on-demand importer server 258 that receives and stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content via satellite, via stored media, via the public network 212, or any combination thereof. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box devices 216, 224, the requests can be transmitted over the access network 266 to the VOD server 236, via the CFT switch 230. Upon receiving such requests, the VOD server 236 can retrieve the requested VOD content and transmit the content to the set-top box devices 216,124 across the access network 266, via the CFT switch 230. The set-top box devices 216, 224 can transmit the VOD content to the television monitors 218, 226. In an illustrative embodiment, video or audio portions of VOD content can be streamed to the set-top box devices 216, 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor server 286 that monitors network elements within or coupled to the IPTV system 200. In a particular embodiment, the OMT switch 260 can communicate with the AQT switch 252 via the public network 212.

In an illustrative embodiment, the live acquisition server 254 can transmit content to the AQT switch 252, and the AQT switch 252, in turn, can transmit the content to the OMT switch 260 via the public network 212. In this embodiment, the OMT switch 260 can transmit the content to the TV2 server 262 for display to users accessing the user interface at the TV2 server 262. For example, a user can access the TV2 server 262 using a personal computer 268 communicating with the public network 212.

In a particular illustrative embodiment, the URL content server 281 can receive video content from a video content source, for example, via the acquisition tier 206. A video content provider can encode an initial interactive content indicator within a closed-captioning portion of the video content at the video content source. In an illustrative embodiment, the initial interactive video content indicator can include a generic URL, such as the generic URL illustrated in FIG. 6. In another embodiment, the initial interactive content indicator can include a default URL, such as a default URL associated with the video content source (e.g., www.cbs.com).

The URL content server 281 can decode the closed-captioning portion of the video content and identify the initial interactive content indicator. For example, the URL content server 281 can produce an American Standard Code for Information Interchange (ASCII) character stream and parse the stream to find a tag having the initial interactive content indicator as its initial tag value. The URL content server 281 can select a substitute URL associated with interactive content related to the video content and replace the initial interactive content indicator with the substitute URL within the closed-captioning portion of the video content.

In an illustrative embodiment, the URL content server 281 can select a substitute URL from a plurality of URLs stored in memory at the URL content server 281 or at a database (not shown) coupled to the URL content server 281. The URL content server 281 can select the substitute URL based on a profile of a subscriber or group of subscribers. Such profiles can be stored, for example, at the subscriber and system store 248. The substitute URL can include a URL corresponding to a product or service displayed in the video content and sold in the market area of a subscriber or group of subscribers served via the private access network 266.

After the initial interactive content indicator is replaced with the substitute URL, the video content can be sent to the set-top box devices 216, 224. In an illustrative embodiment, the URL content server 281 can send the video content to the video server(s) 280, and the video server(s) 280 can send the video content to the set-top box devices 216, 224 via the private access network 266.

In a particular embodiment, the URL content server 281 can receive data from a set-top box device, such as the second representative set-top box device 224, indicating a selection of a substitute URL at the set-top box device 224. The URL content server 281 can retrieve interactive content associated with the substitute URL, such as web page content, via the public network 212. The URL content server 281 can send the interactive content to the set-top box device 224 via the CFT switch 230. Alternatively, the URL content server 281 can send the interactive content to the video server(s) 280 or another server of the IPTV system for delivery to the set-top box device 224.

Figure 3:
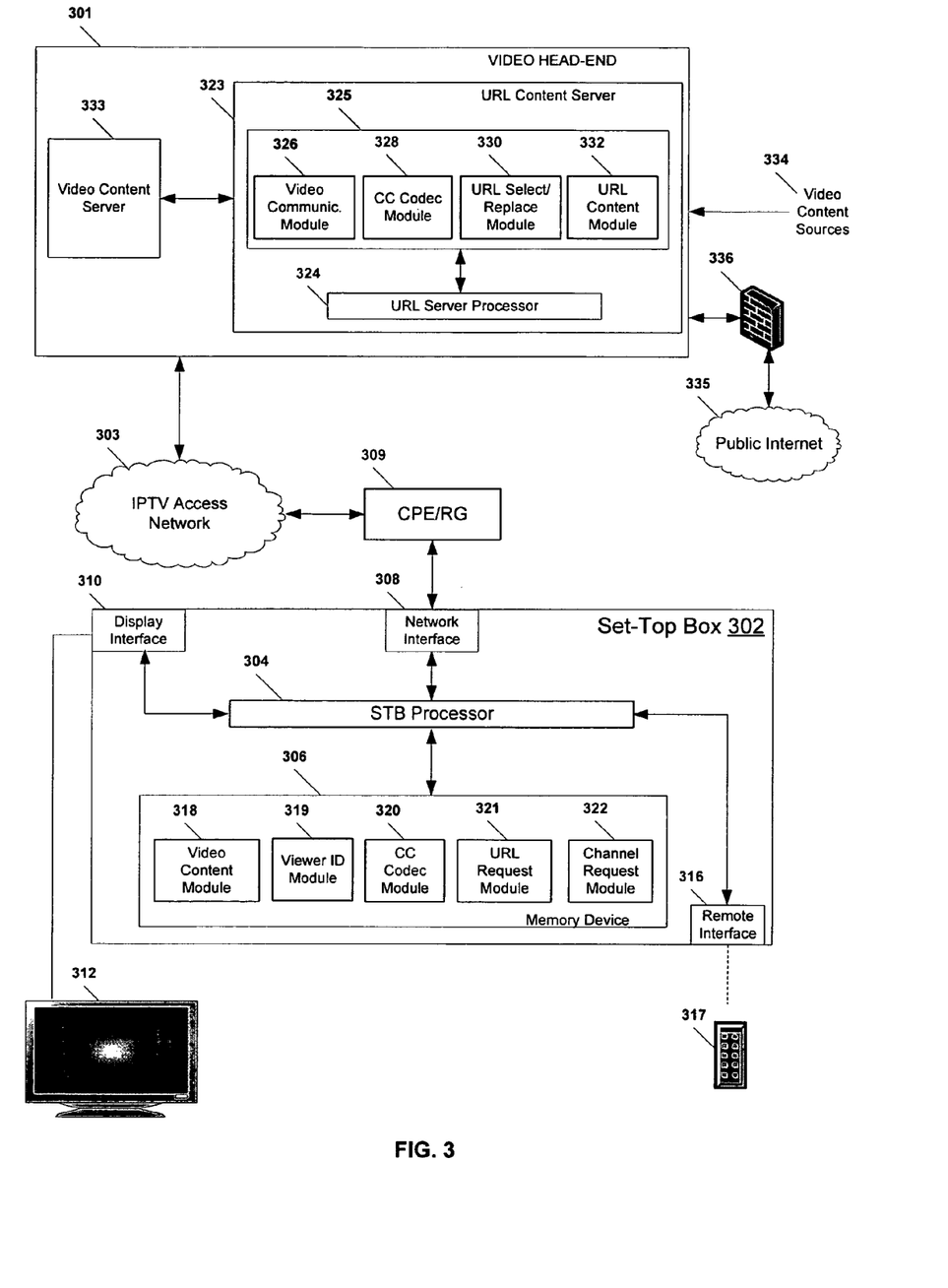
FIG. 3 is a block diagram of a third particular illustrative embodiment of a system to provide interactive video content.

Referring to FIG. 3, a third particular embodiment of a system to provide interactive video content is illustrated and designated generally at 300. The system 300 includes a set-top box device 302 that communicates with a video head-end 301 of an Internet Protocol Television (IPTV) system via an IPTV access network 303. The video head-end 301 communicates with one or more video content sources 334.

As illustrated in FIG. 3, the set-top box device 302 includes a STB processor 304 and a memory device 306 accessible to the STB processor 304. In an illustrative, non-limiting embodiment, the STB processor 304 can communicate with the IPTV access network 303 via the network interface 308. In a particular embodiment, the customer premises equipment (CPE) 309 can facilitate communication between the network interface 308 and the IPTV access network 303. The CPE 309 can include a residential gateway (RG) device, router, switch, a local area network device, a modem, such as a digital subscriber line (DSL) modem, any other suitable device for facilitating communication between the network interface 308 of the set-top box device 302 and the IPTV access network 303, or any combination thereof. The STB processor 304 can send video content to a display device 312 via a display interface 310. In addition, the STB processor 304 can receive commands from a remote control device 317 via a remote interface 316.

In a particular embodiment, the memory device 306 can include a video content module 318 that is executable by the STB processor 304 to receive video content via the IPTV access network 303 and to buffer the video content before sending it to the display interface 310, in order to prevent underflow to the display device 312. The video content can include at least a video portion and a closed-captioning portion. The closed-captioning portion can include one or more initial interactive content indicators, one or more substitute URLs, or any combination thereof (e.g., the closed-captioning portion can include one or more substitute URLs inserted at the video head-end 301, one or more initial interactive content indicators that are to be replaced at the set-top box device 302, or any combination thereof).

In a particular embodiment, the memory device 306 can include a viewer identification module 319 that is executable by the STB processor 304 to receive login identification information, authentication token information, or other information identifying a party currently viewing video content received at the set-top box device 302. In an illustrative embodiment, the viewer identification module 319 can be executable by the STB processor 304 to send data to the central video head-end 301 indicating a current viewer, for example, where multiple viewers are associated with a subscriber account related to the set-top box device 302.

In a particular embodiment, the memory device 306 can include a closed-captioning coder/decoder (CC codec) module 320 that is executable by the STB processor 304 to decode the closed-captioning portion of the video content received via the IPTV access network 303. Further, the CC codec module 320 can be executable by the STB processor 304 to identify an initial interactive content indicator within the closed-captioning portion, such as a generic or default URL or other interactive content indicator. In an illustrative embodiment, the CC codec module 320 can be executable by the STB processor 304 to produce an ASCII character stream from the closed-captioning portion of the video content and to parse the ASCII character stream to identify the initial interactive content indicator.

In a particular embodiment, the memory device can include a URL request module 321 that is executable by the STB processor 304 to request a viewer-specific URL to replace an initial interactive content indicator within the closed-captioning portion of video content received at the set-top box device 302. For example, the URL request module 321 can be executable by the STB processor 304 to send a request to the video head-end 301 for a viewer-specific URL that is selected based on a profile associated with a subscriber account related to the set-top box device 302. In an illustrative embodiment, multiple viewer profiles, including a profile of the subscriber, can be associated with the subscriber account, and the profile used to select the viewer-specific URL can be selected by determining whether the subscriber or another viewer is logged in at the set-top box device 302.

Further, the URL request module 321 can be executable by the STB processor 304 to receive a selection of a viewer-specific URL, for example, by receiving a signal from the remote control device 317 indicating a selection of a URL key or another selection of the substitute URL on an interface displayed at the display device 312. The URL request module 321 can be executable by the STB processor 304 to send data indicating the selection to the video head-end 301. The URL request module 321 can be executable by the STB processor 304 to receive interactive content, such as web page content, associated with the URL from the video head-end 301 and to send the interactive content to the display device 312. The interactive content can be displayed in place of, or together with, video content, according to viewer preferences stored at the set-top box device 302.

In a particular embodiment, the memory device 306 can include a channel request module 322 that is executable by the STB processor 304 to receive channel selections, for instance, from the remote control device 317. In an illustrative embodiment, when a channel change request is received at the set-top box device 302, the set-top box device 302 can receive second video content associated with another channel and request one or more second viewer-specific URLs related to the second video content from the central video head-end 301.

As illustrated in FIG. 3, the video head-end 301 can include a URL content server 323 and a video server 333. The URL content server 323 can include a URL content server processor 324 and a URL content server memory device 325 that is accessible to the URL content server processor 324. The URL content server memory device 325 can include a video communication module 326 that is executable by the URL content server processor 324 to communicate with the video content sources 334 to receive video content. Further, the video communication module 326 can be executable by the URL content server processor 324 to send video content to the video content server 333 for delivery to the set-top box device 302.

In a particular embodiment, the URL content server memory device 325 can include a closed-captioning coder/decoder (CC codec) module 328 that is executable by the URL content server processor 324 to decode the closed-captioning portion of the video content received at the video head-end 301. Further, the CC codec module 328 can be executable by the URL content server processor 324 to identify an initial interactive content indicator within the closed-captioning portion, such as a generic or default URL or other interactive content indicator. In an illustrative embodiment, the CC codec module 328 can be executable by the URL content server processor 324 to produce an ASCII character stream from the closed-captioning portion of the video content and to parse the ASCII character stream to identify the initial interactive content indicator.

In a particular embodiment, the URL content server memory device 325 can include a URL select/replace module 330 that is executable by the URL content server processor 324 to select a substitute URL to replace an initial interactive content indicator. In an illustrative embodiment, the URL select/replace module 330 can be executable by the URL content server processor 324 to replace the initial interactive content indicator with the substitute URL within a closed-captioning portion of the video content decoded at the URL content server 323. In another illustrative embodiment, the URL select/replace module 330 can be executable by the URL content server processor 324 to send the substituted URL to the set-top box device 302 in response to a request for a viewer-specific URL request. The set-top box device 302 can replace the initial interactive content indicator with the substitute URL within a closed-captioning portion of the video content decoded at the set-top box device 302. In an illustrative embodiment, the substitute URL can be selected from a plurality of URLs based on a profile associated with a subscriber account related to the set-top box device 302.

In a particular embodiment, the URL content server 323 can include a URL content module 332 that is executable by the URL content server processor 324 to receive data indicating a selection of a substitute URL at the set-top box device 302. The URL content module 332 can be executable by the URL content server processor 324 to communicate with the public Internet 335 via a firewall 336, Internet mediation device, other device, or any combination thereof, to retrieve interactive content, such as a web page, corresponding to the substitute URL. In an illustrative embodiment, URL content module 332 can be executable by the URL content server processor 324 to send the interactive content to the set-top box device 302 or to the video server 333 for delivery to the set-top box device 302.

In an illustrative embodiment, the various modules 318-322 and 326-332 can include logic, hardware, computer instructions, or any combination thereof.

Figure 4:
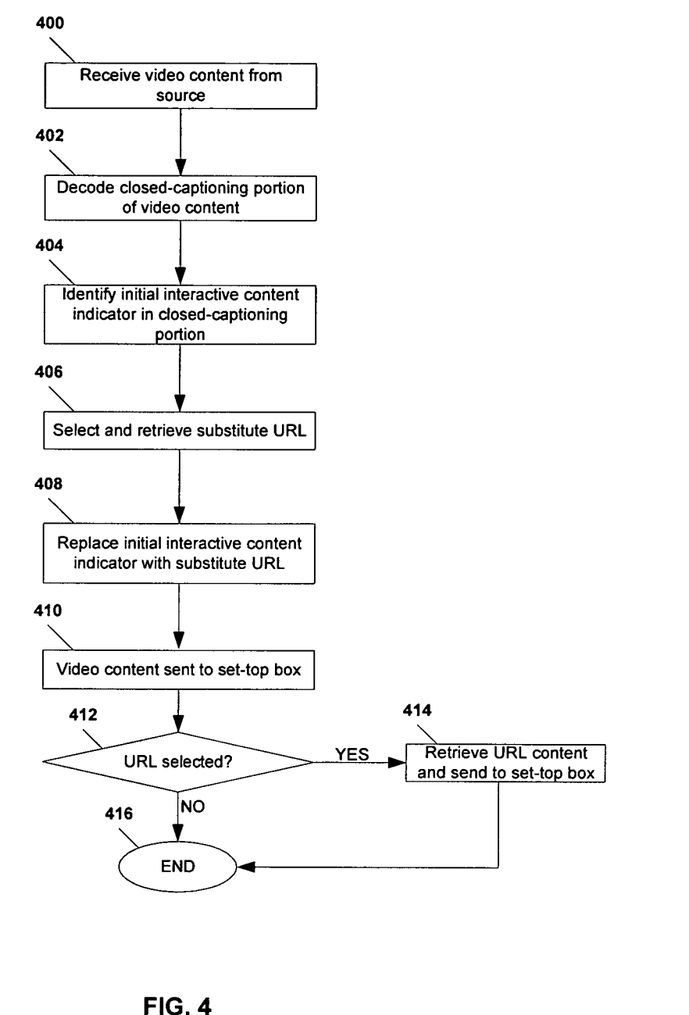
FIG. 4 is a flow diagram of a particular illustrative embodiment of a method of providing interactive video content.

Referring to FIG. 4, a particular illustrative embodiment of a method of providing interactive video content is illustrated. At block 400, a server at a video head-end of an Internet Protocol Television (IPTV) system receives video content from a video content source. Moving to block 402, the server decodes a closed-captioning portion of the video content. Continuing to block 404, the server identifies an initial interactive content indicator within the closed-captioning portion of the video content.

Proceeding to block 406, the server selects and retrieves a substitute uniform resource locator (URL) to replace the initial interactive content indicator within the closed-captioning portion of the video content. In a particular embodiment, the server can select the substitute URL based on information associated with a subscriber, such as information of a profile associated with a subscriber account. In an illustrative embodiment, the substitute URL can correspond to interactive content related to a product or service displayed by the video content. The server can retrieve the substitute URL from a database coupled to, or otherwise accessible to, the server. In an illustrative, non-limiting embodiment, the server can determine information of a profile to be used in selecting a substitute URL, and the server can query the database for a URL matching the information.

Advancing to block 408, the server replaces the initial interactive content indicator with the substitute URL. Moving to block 410, the video content with the substitute URL is sent to a set-top box device associated with the subscriber. In an illustrative embodiment, the server can send the video content to the set-top box device. In another embodiment, the server can send the video content to a video server or other server of the IPTV system for delivery to the set-top box device. At decision node 412, the server determines whether it has received data indicating a selection of the substitute URL at the set-top box device. If such data has been received, the method proceeds to block 414, and the server retrieves interactive content corresponding to the URL and sends the interactive content to the set-top box device. The method terminates at 416.

Figure 5:
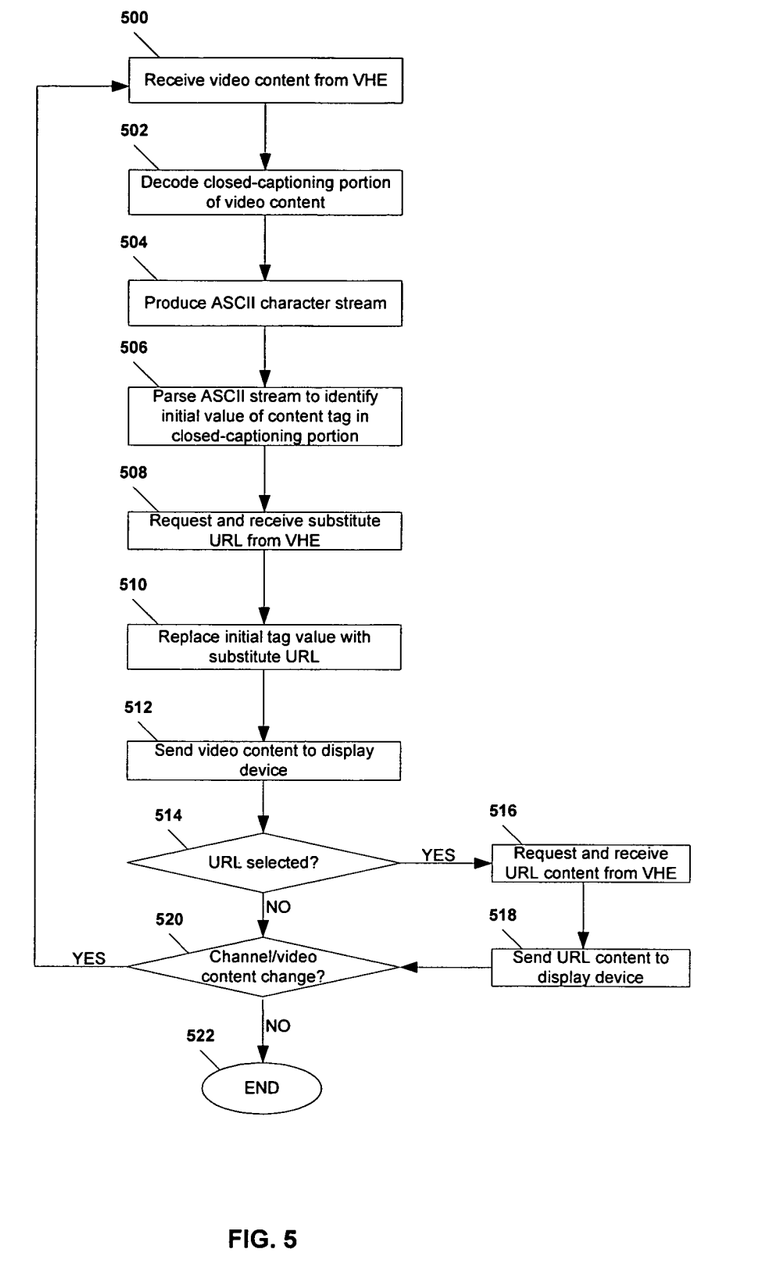
FIG. 5 is a flow diagram of a second particular illustrative embodiment of a method of providing interactive video content.

Referring to FIG. 5, a second particular illustrative embodiment of a method of providing interactive video content is illustrated. At block 500, a set-top box device receives video content from a video head-end of a video distribution system, such as an Internet Protocol Television (IPTV) system. Moving to block 502, the set-top box device decodes a closed-captioning portion of the video content. Proceeding to block 504, in a particular embodiment, the set-top box device can produce an ASCII character stream from the closed-captioning portion of the video content.

Continuing to block 506, the set-top box device can parse the ASCII character stream to identify a content tag and an initial value of the content tag within the closed-captioning portion of the video content. In an illustrative embodiment, the initial value of the content tag can be a generic or default interactive content indicator, such as a generic or default uniform resource locator (URL), encoded within the closed-captioning portion of the video content by a video content provider.

At block 508, the set-top box device can request and receive a substitute URL, such as a viewer-specific URL, from the video head-end. In a particular embodiment, the set-top box device can send data to the video head-end indicating a viewer that is logged in at the set-top box device. The viewer can be determined at the set-top box device based, for example, on login information, authentication information, or other information identifying the viewer. In an illustrative embodiment, a profile of the viewer can be associated with a subscriber account at the video head-end and can be used to select the viewer-specific URL. Moving to block 510, the set-top box device can replace the initial value of the content tag within the closed-captioning portion of the video content with a substitute tag value that includes the substitute URL. Advancing to block 512, the set-top box device sends the video content with the substitute URL to a display device couple to the set-top box device.

Proceeding to decision node 514, the set-top box device determines whether it has received a selection of the substitute URL, for example, from a remote control device. If the set-top box device does not receive a selection of the substitute URL, the method continues to decision node 520. Whereas, if the set-top box device receives such a selection, the method moves to block 516, and the set-top box device requests and receives interactive content associated with the URL from the video head-end. At block 518, the set-top box device sends the interactive content to the display device. The method then continues to decision node 520.

At decision node 520, the set-top box device determines if it has received a channel change request. In a particular embodiment, if the set-top box device receives a channel change request, the method can return to block 500, and the set-top box device can receive video content of the selected channel from the video head-end. The method terminates at 522.

The embodiments of the methods disclosed are given for illustrative purposes only. In other embodiments, aspects of the methods can be performed in various sequences or simultaneously.

Figure 6:
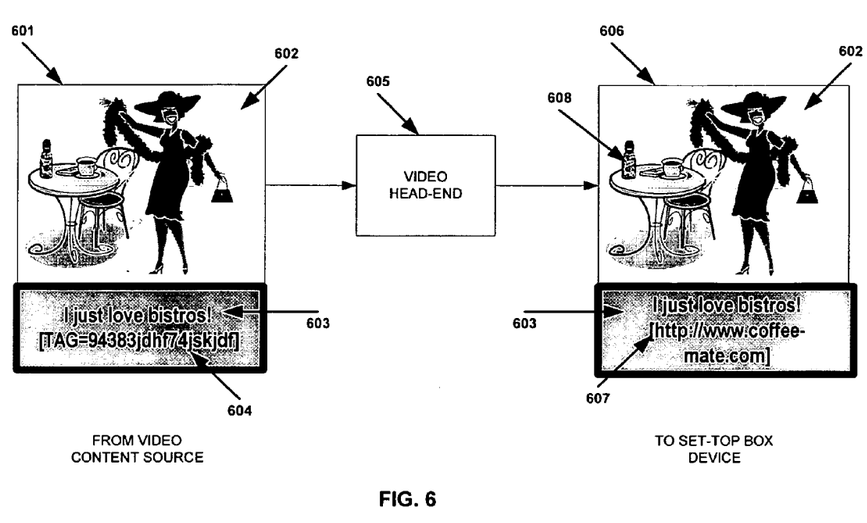
FIG. 6 is a diagram of a particular illustrative embodiment of an interface to provide interactive video content.

Referring to FIG. 6, a particular illustrative embodiment of an interface to provide interactive video content is illustrated. In the embodiment shown, initial video content 601 includes a video content portion 602 and a closed-captioning portion 603. The closed-captioning portion 603 includes an initial tag/value pair 604 in which the value of a content tag includes a generic uniform resource locator (URL).

The video content 601 can be sent to a video head-end 605. The video head-end can select a substitute URL and replace the generic URL within the closed-captioning portion 603 of the video content 601. The video head-end thus produces altered video content 606 that includes the video content 602 and the closed-captioning portion 603. However, the closed-captioning portion 603 includes an altered tag/value pair 607, in which the value of the content tag includes the substitute URL. In an illustrative embodiment, the substitute URL can be a URL corresponding to interactive content related to a product 608 displayed by the video content.

In conjunction with the configuration of structure described herein, the system and method disclosed provide interactive video content. In a particular illustrative embodiment, a server at a video head-end can receive video content from a video content source. The video content includes at least a video portion and a closed-captioning portion. A video content provider can encode an initial interactive content indicator within the closed-captioning portion of the video content at the video content source. For instance, the video content provider can mark one or more data packets, frames, or any combination thereof, of the video content with content tags, and the initial video content indicator can include a generic or default tag value assigned by the video content provider. In an illustrative embodiment, the initial interactive video content indicator can include a generic or default uniform resource locator (URL).

The server can decode the closed-captioning portion of the video content, for example, by decoding one or more data packets or frames of the video content, and can identify the initial interactive content indicator. For example, in an illustrative, non-limiting embodiment, the server can access the closed-captioning portion of the video content and produce an American Standard Code for Information Interchange (ASCII) character stream. The server can parse the stream to find a tag having the initial interactive content indicator as its tag value. The server can select a substitute URL associated with interactive content related to the video content and replace the initial interactive content indicator with the substitute URL within the closed-captioning portion of the video content.

In an illustrative embodiment, the server can select the substitute URL from a plurality of URLs stored in memory at the server or at a database coupled to, or otherwise accessible to, the server. The server can select the substitute URL based on a profile of a subscriber or group of subscribers. The profile can include a demographic classification or identifier, a geographic region, a market area, a neighborhood, a zip code, a subscriber preference, a buying habit, a web surfing habit, another subscriber behavior, a calendar date, a time of day, a season, a credit score, or any combination thereof. The substitute URL can include a URL associated with interactive content related to a product or service displayed by the video content and sold in a market area of a subscriber or group of subscribers served by the video head-end.

After the initial interactive content indicator is replaced with the substitute URL, the video content can be sent to the set-top box device. In an illustrative embodiment, the server can send the video content to another server, such as a video server or channel content application server, and the other server can send the video content to the set-top box device. In a particular embodiment, the server can receive data from the set-top box device indicating a selection of the substitute URL. The server can retrieve interactive content associated with the substitute URL, such as web page content, via the Internet. The server can send the interactive content to the set-top box device, or the server can send the interactive content to another server for delivery to the set-top box device.

Figure 7:
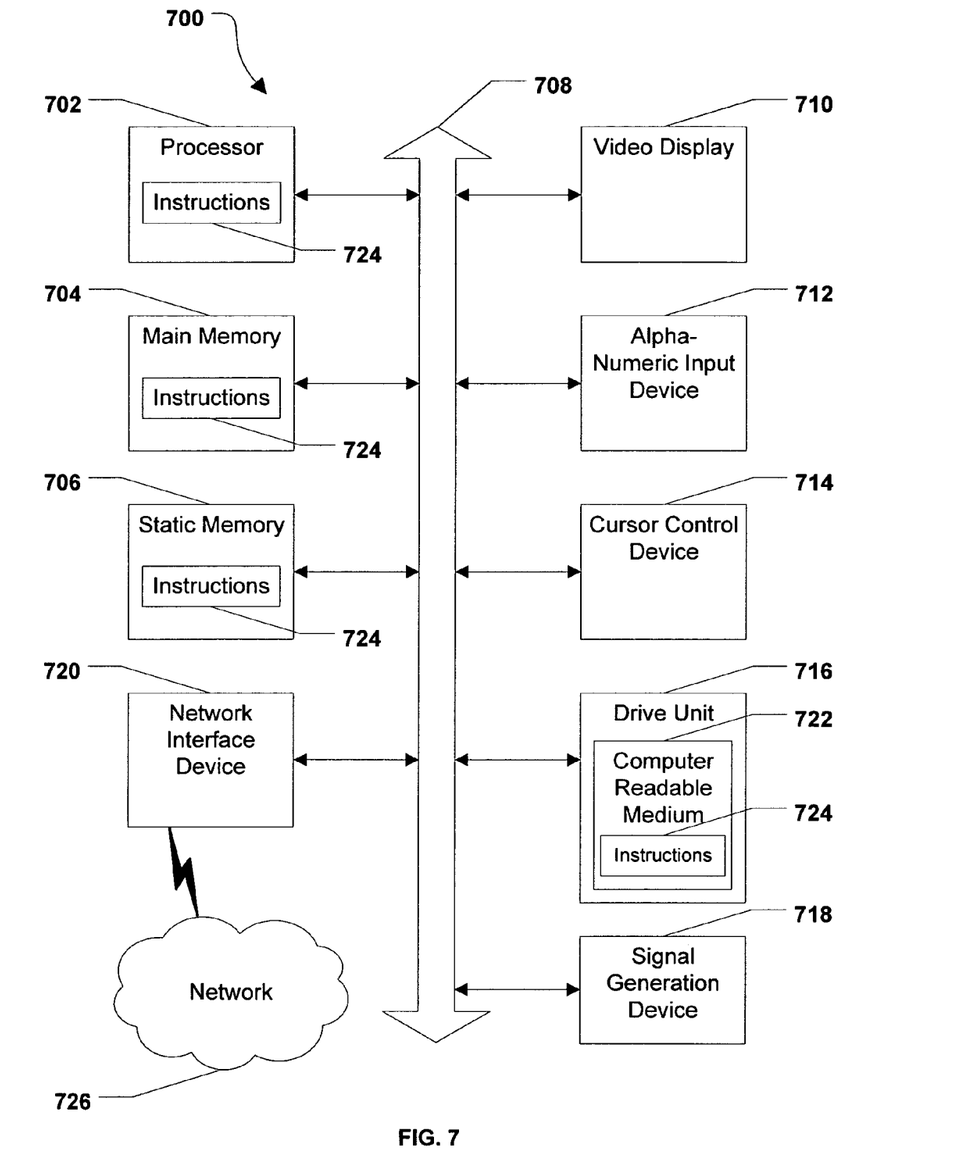
FIG. 7 is a diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, such as the devices shown in FIGS. 1-3.

In a networked deployment, the computer system may operate in the capacity of a set-top box device, server, or other device, as illustrated in FIGS. 1-3. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. Further, the computer system 700 can include a wireless input device 715, e.g., a remote control device. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. Accordingly, the disclosure is considered to include a tangible storage medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing interactive video content, the method comprising:
   receiving video content at a video head-end from a video content source, wherein the video content includes an initial interactive content indicator, wherein the initial interactive content indicator is encoded within a closed-captioning portion of the video content at the video content source, and wherein the initial interactive content indicator includes a uniform resource locator;
   identifying, at the video head-end, a type of the uniform resource locator included in the initial interactive content indicator;
   receiving, at the video head-end from a set-top box device, data indicating a particular user, wherein the particular user is indicated based on authentication information associated with the particular user;
   selecting, at the video head-end, a profile of the particular user;
   subsequent to identifying the type of the uniform resource locator as a default uniform resource locator, selecting, at the video head-end, a substitute uniform resource locator associated with a product, wherein the default uniform resource locator identifies the video content source, wherein the video content source is distinct from an advertiser, and wherein the substitute uniform resource locator is selected based on the profile of the particular user; and
   replacing, at the video head-end, the uniform resource locator with the substitute uniform resource locator within the closed-captioning portion of the video content.

2. The method of claim 1, wherein the video content is sent to the set-top box device after the uniform resource locator is replaced with the substitute uniform resource locator, wherein the authentication information includes an authentication token, and wherein the profile is selected from a plurality of profiles of users associated with the set-top box device.

3. The method of claim 1, further comprising sending the video content to the set-top box device via a network of a television system, wherein the video head-end includes a regional video head-end of the television system associated with a market area associated with the set-top box device.

4. The method of claim 1, further comprising:
   receiving data indicating a selection of the substitute uniform resource locator from the set-top box device; and
   retrieving interactive content associated with the substitute uniform resource locator.

5. The method of claim 1, wherein the substitute uniform resource locator is selected based on a demographic classification of the particular user, a behavior of the particular user, a buying habit of the particular user, or any combination thereof, and wherein the substitute uniform resource locator corresponds to an advertisement for the product.

6. The method of claim 1, wherein the profile is associated with Internet usage of the particular user, a credit score of the particular user, a season of a year, and a market area associated with the video head-end.

7. The method of claim 1, wherein the video content source is a particular television network, and wherein the default uniform resource locator identifies the particular television network.

8. The method of claim 1, wherein the video content includes an advertisement for the product, and wherein the product is associated with the advertiser.

9. The method of claim 1, wherein the initial interactive content indicator includes a tag value of a content tag within the closed-captioning portion of the video content.

10. A method comprising:
    receiving video content at a set-top box device from a video head-end, wherein the video head-end receives the video content from a video content source, wherein an initial interactive content indicator is encoded within a closed-captioning portion of the video content prior to receiving the video content at the video head-end, and wherein the initial interactive content indicator includes a uniform resource locator;
    identifying, via a processor of the set-top box device, a type of the uniform resource locator included in the initial interactive content indicator;
    subsequent to identifying the type of the uniform resource locator as a default uniform resource locator, sending data from the set-top box device to the video head-end, wherein the default uniform resource locator identifies the video content source, wherein the video content source is distinct from an advertiser, wherein the data includes a request for a viewer-specific uniform resource locator, and wherein the data indicates a particular user based on authentication information associated with the particular user;
    receiving the viewer-specific uniform resource locator from the video head-end in response to the request, wherein the viewer-specific uniform resource locator is associated with the advertiser, and wherein the viewer-specific uniform resource locator is selected based on a profile of the particular user; and
    replacing the uniform resource locator with the viewer-specific uniform resource locator within the closed-captioning portion of the video content.

11. The method of claim 10, further comprising sending the video content to a display device after the uniform resource locator has been replaced with the viewer-specific uniform resource locator, wherein the video content includes an advertisement for a product or a service, and wherein the viewer-specific uniform resource locator is associated with the product or the service.

12. The method of claim 10, wherein the authentication information includes login identification information.

13. The method of claim 10, further comprising:
    receiving, at the set-top box device, a selection of the viewer-specific uniform resource locator;
    sending data indicating the selection of the viewer-specific uniform resource locator from the set-top box device to the video head-end;
    receiving interactive content corresponding to the viewer-specific uniform resource locator at the set-top box device; and
    sending the interactive content from the set-top box device to a display device.

14. The method of claim 13, wherein the interactive content is displayed concurrently with the video content at the display device.

15. The method of claim 10, further comprising:
   receiving, at the set-top box device, a channel change selection;
   receiving, at the set-top box device, second video content associated with a selected channel, wherein a second initial interactive content indicator is encoded in a second closed-captioning portion of the second video content, and wherein the second initial interactive content indicator includes a second uniform resource locator;
   identifying, via the processor, a type of the second uniform resource locator included in the second initial interactive content indicator;
   subsequent to identifying the type of the second uniform resource locator as a generic uniform resource locator, sending a second request for a second viewer-specific uniform resource locator from the set-top box device to the video head-end;
   receiving the second viewer-specific uniform resource locator from the video head-end in response to the second request, wherein the second video content includes an advertisement for a product or a service, wherein the second viewer-specific uniform resource locator is associated with the product or the service, and wherein the second viewer-specific uniform resource locator is selected based on the profile of the particular user; and
   replacing the second uniform resource locator with the second viewer-specific uniform resource locator within the second closed-captioning portion of the second video content.

16. The method of claim 10, wherein the video content source is a particular television network, wherein the default uniform resource locator identifies the particular television network, and wherein the default uniform resource locator is distinct from a generic uniform resource locator.

17. The method of claim 10, further comprising:
   identifying, via the processor, a type of a second uniform resource locator included in a second initial interactive content indicator, wherein the second initial interactive content indicator is encoded in second video content received at the set-top box device from the video head-end; and
   subsequent to identifying the type of the second uniform resource locator as a generic uniform resource locator, sending a second request for a second viewer-specific uniform resource locator from the set-top box device to the video head-end, wherein the generic uniform resource locator does not identify the advertiser.

18. A system comprising:
   a processor; and
   a memory accessible to the processor, the memory including instructions executable by the processor to perform operations comprising:
      receiving video content from a video content source, wherein an initial interactive content indicator is encoded within a closed-captioning portion of the video content at the video content source, and wherein the initial indicator includes a uniform resource locator;
      identifying a type of the uniform resource locator included in the initial interactive content indicator;
      receiving, from a set-top box device, data indicating a particular user, wherein the particular user is indicated based on authentication information associated with the particular user;
      selecting a profile of a subscriber associated with the set-top box device, wherein the profile is selected based on the particular user indicated by the data;
      subsequent to identifying the type of the uniform resource locator as a default uniform resource locator, selecting a substitute uniform resource locator associated with an advertiser, wherein the default uniform resource locator identifies the video content source, wherein the video content source is distinct from the advertiser, and wherein the substitute uniform resource locator is selected based on the profile of the subscriber; and
      replacing the uniform resource locator with the substitute uniform resource locator within the closed-captioning portion of the video content.

19. The system of claim 18, wherein the substitute uniform resource locator is selected from a plurality of uniform resource locators stored in the memory.

20. The system of claim 18, wherein the memory and the processor are included in a server of a television system.

21. A set-top box device comprising:
   a processor;
   an interface to receive video content from a video head-end, the video content including an initial interactive content indicator encoded within a closed-captioning portion of the video content, wherein the initial interactive content indicator includes a uniform resource locator, and wherein the video head-end receives the video content from a video content source; and
   a memory accessible to the processor, the memory including instructions executable by the processor to perform operations comprising:
      identifying a type of the uniform resource locator included in the initial interactive content indicator;
      subsequent to identifying the type of the uniform resource locator as a default uniform resource locator, sending data to the video head-end, wherein the default uniform resource locator identifies the video content source, wherein the video content source is distinct from an advertiser, wherein the data includes a request for a viewer-specific uniform resource locator, and wherein the data indicates a particular user based on authentication information associated with the particular user;
      receiving the viewer-specific uniform resource locator from the video head-end in response to the request, wherein the viewer-specific uniform resource locator is associated with the advertiser, and wherein the viewer-specific uniform resource locator is selected based on a profile of the particular user; and
      replacing the uniform resource locator with the viewer-specific uniform resource locator within the closed-captioning portion of the video content.

22. The set-top box device of claim 21, wherein the operations further comprise:
   accessing the closed-captioning portion of the video content; and
   producing an American Standard Code for Information Interchange character stream from the closed-captioning portion.

23. The set-top box device of claim 22, wherein the operations further comprise:
   parsing the American Standard Code for Information Interchange character stream to identify the uniform resource locator; and
   substituting the viewer-specific uniform resource locator for the uniform resource locator.

24. A computer-readable storage device including instructions that are executable by a processor to perform operations comprising:

receiving video content at a video head-end from a video program content source, wherein an initial interactive content indicator is encoded within a closed-captioning portion of the video content at the video content source, and wherein the initial interactive content indicator includes a uniform resource locator;

identifying, at the video head-end, a type of uniform resource locator included in the initial interactive content indicator;

receiving, from a set-top box device, data indicating a particular user, wherein the particular user is indicated based on authentication information associated with the particular user;

selecting a subscriber profile based on the particular user indicated by the data;

subsequent to identifying the type of the uniform resource locator as a default uniform resource locator, selecting a substitute uniform resource locator associated with an advertiser, wherein the default uniform resource locator identifies the video program content source, wherein the video program content source is distinct from the advertiser, and wherein the substitute uniform resource locator is selected based on the subscriber profile; and     replacing the uniform resource locator with the substitute uniform resource locator within the closed-captioning portion of the video content.

25. The computer-readable storage device of claim 24, wherein the video content is sent to the set-top box device after the uniform resource locator is replaced with the substitute uniform resource locator.

26. The computer-readable storage device of claim 24, wherein the operations further comprise:

accessing the closed-captioning portion of the video content; and     producing an American Standard Code for Information Interchange character stream from the closed-captioning portion.

27. The computer-readable storage device of claim 26, wherein the operations further comprise:

parsing the American Standard Code for Information Interchange character stream to identify the uniform resource locator; and     searching a database for the substitute uniform resource locator.

\* \* \* \* \*